Patented July 13, 1943

2,324,417

UNITED STATES PATENT OFFICE 2,324,417

PREPARATION OF DERIVATIVES OF DIMETHYLOL UREA

John A. Murray and Andrew W. Kassay, Toledo, Ohio, assignors, by mesne assignments, to Libbey-Owens-Ford Glass Company, a corporation of Ohio No Drawing. Application November 28, 1941, Serial No. 420,820

4 Claims. (Cl. 260—553)

This application is in part a continuation of application Serial No. 393,974, filed May 17, 1941, which in turn is a division of application Ser. No. 207,546, filed May 12, 1938. The present invention relates to the preparation of derivatives of dimethylol urea containing alkoxy groups, and the principal object of the invention is to provide an improved method of preparing such derivatives. More specific objects and advantages are apparent from the description, which merely discloses and illustrates the invention and is not intended to impose limitations upon the claims.

As a result of the present invention it was discovered that the high viscosity of the formaldehyde-urea lacquers produced by prior methods was due to the impossibility of properly controlling the degree to which the formaldehyde-urea reaction progressed in the methods. The high viscosity of the resulting lacquers was due to the advanced stage to which the formaldehyde-urea reaction had been carried in their preparation. The formaldehyde-urea compounds in lacquers prepared in accordance with the present invention are believed to be distinctly different from the formaldehyde-urea compounds in prior lacquers. Possibly they are of a much lower molecular weight.

The nature of the formaldehyde-urea compounds in the present lacquers makes them more compatible as well as less viscous than prior lacquers. The high viscosity that prior lacquers assumed during the last stages of their manufacture made it extremely difficult to remove therefrom the last traces of the free water that is split off during the formaldehyde-urea reaction. Although as much water was removed from these lacquers as it was thought to be possible to remove, there was in fact some water dissolved in them that tended to lower their compatibility with the volatile hydrocarbons commonly employed as thinners.

The process by which formaldehyde-urea lacquers are prepared in accordance with the invention requires the evaporation from the reaction mixture of a large quantity of an organic solvent. Preferably, the evaporation is carried out under a vacuum so that the temperature may be kept as low as desired. Thus a characteristic of the process is a prolonged formaldehyde-urea reaction at a relatively low temperature rather than a more rapid formaldehyde-urea reaction at a higher temperature. It should be noted that the formaldehyde-urea reaction can be properly controlled only by controlling the temperature during the whole process.

The initial formaldehyde-urea reaction product used in carrying out the present invention is dimethylol urea. The dimethylol urea is first dissolved in an alcohol such as glycol monomethyl ether, n-pentanol, or an alcohol lower than n-pentanol, such as methanol or n-butanol. An excess of the alcohol is required in order to dissolve the dimethylol urea at a reasonably low temperature, i. e., about 45° C. or less. An acid must be present in order to cause a solution to be formed from the dimethylol urea and the alcohol. When this alcoholic solution is prepared, sufficient acid must be employed so that the dimethylol urea can be dissolved in a reasonable period of time at the required low temperature. One mistake that has been made in prior methods of preparing lacquers is the use of excessively high temperatures to cause formaldehyde-urea compounds to dissolve rapidly in organic solvents. Of course the acidity of the reaction mixture in the present process should not be high enough to hasten the formaldehyde-urea reaction unduly. High acidity, like high temperature, may cause the reaction to get out of control.

It is well known that when dimethylol urea is thus dissolved in an excess of an alcohol under acid conditions, each molecule of dimethylol urea in dissolving reacts with two molecules of the alcohol to form one molecule of di-(alkoxy methyl) urea. It is also well known that such dissolving of dimethylol urea takes place more readily with lower alcohols, and less readily with higher alcohols. Thus the alcohol that most readily dissolves and reacts with dimethylol urea is methanol. Alcohols not higher than n-pentanol are suggested above for dissolving the dimethylol urea, because those are the alcohols that dissolve and react with dimethylol urea without great difficulty.

Although lower alcohols such as methanol dissolve and react with dimethylol urea more readily than higher alcohols, reaction products of dimethylol urea with such lower alcohols are not desirable starting materials for the preparation of lacquer solutions, because these lower alcohols are too volatile to be satisfactory as lacquer solvents.

In the process of the present invention, the original reaction product of one molecule of dimethylol urea and two molecules of an alcohol is converted into a reaction product of dimethylol urea and a higher alcohol. For example, a derivative of dimethylol urea containing methoxy groups, i. e., di-(methoxy methyl) urea, is converted into a derivative of dimethylol urea containing butoxy groups.

The process is carried out simply by adding the reaction product of one molecule of dimethylol urea with two similar or dissimilar alcohol molecules, each having not more than five carbon atoms, to an alcohol having a larger number of carbon atoms than at least one of said two alcohol molecules, and then evaporating, preferably under a vacuum and at a temperature at which the solution boils rapidly. Under these conditions, an equilibrium is set up between the alcohols. Of course, the lower alcohol is more volatile and boils away more rapidly, so that the proportion of the higher alcohol present continually increases, and the proportion of the lower alcohol continually decreases. This change in proportions displaces the equilibrium, so that the higher alcohol gradually displaces the lower alcohol from the di-(alkoxy methyl) urea, thus converting the original reaction product of dimethylol urea and the lower alcohol into a reaction product of dimethylol urea and the higher alcohol.

If this evaporation is carried out for a reasonable period of time, substantially all of the lower alcohol is removed, and the product remaining consists of the reaction product of dimethylol urea and the higher alcohol. If desired, the solution may be heated to cause condensation of this reaction product, until the desired viscosity has been attained.

The evaporation of a large excess of an organic solvent from the reaction mixture is an important feature of the process.

The reaction mixture from which the evaporation takes place may consist simply of an alcoholic solution of the formaldehyde-urea compound, or it may consist of a mixture of the alcoholic solution with one or more immiscible liquids. The organic solvent that is evaporated in the practice of the present process must be one of the solvents contained in the alcoholic solution. Any immiscible liquid that is mixed with the alcoholic solution may be disregarded in this discussion because the only function of such a liquid would be to facilitate the evaporation of the alcoholic solution at a low temperature, just as steam distillation facilitates the evaporation of organic compounds at temperatures below their boiling points.

Although prior formaldehyde-urea lacquers are made extremely viscous by dissolving nitro-cellulose solutions therein, lacquers may be prepared in accordance with the invention in which nitrocellulose solutions of equal concentration can be dissolved without producing a material increase in viscosity.

The formaldehyde-urea compound in a lacquer prepared in accordance with the invention may contain alkoxy groups derived from the alcohol, such as glycol monomethyl ether, n-pentanol, or a lower alcohol, in which the dimethylol urea was dissolved in the preparation of the lacquer. However, if the evaporation is carried out for a reasonable period of time after the addition of the higher alcohol, the alkoxy groups derived from the lower alcohol are substantially all replaced by alkoxy groups derived from the higher alcohol.

When an alkoxy group in the di-(alkoxy methyl) urea is to be replaced in accordance with the invention, the alcohol that is added prior to the evaporation step must contain a larger number of carbon atoms than the alkoxy group that is to be replaced. Thus when a pentoxy group is to be replaced in the di-(alkoxy methyl) urea, an alcohol higher than pentanol, such as capryl alcohol, is added.

The reaction products most commonly used in formaldehyde-urea lacquers are derivatives of dimethylol urea containing butoxy groups, and butanol or a higher alcohol makes a satisfactory lacquer solvent. It is recommended that lacquers prepared in accordance with the invention contain an amount of n-butanol or n-pentanol that is not less than one-quarter of the weight of dry solids, to give them maximum compatibility. Considerably greater proportions of n-butanol or n-pentanol have been necessary in formaldehyde-urea lacquers heretofore produced in order to give them even mediocre compatibility.

In the following examples, a derivative of dimethylol urea containing pentoxy groups is prepared:

*Example 1*

100 parts of dimethylol urea, 300 parts of methanol, and 1 part of maleic acid are kept at 45°–48° C. until the dimethylol urea has dissolved (15 to 45 minutes). A substantially quantitative yield of di-(methoxy methyl) urea is thus obtained in the form of a solution in the excess of methanol. This solution is filtered, and after the addition of 200 parts of n-pentanol, the solution is evaporated as rapidly as possible under a vacuum of 15 to 30 inches. During such evaporation, the methanol is removed very rapidly, and the proportion of n-pentanol in the solution rapidly increases. This change in proportions causes methoxy groups in the dissolved reaction product to be replaced by pentoxy groups. In this manner, the dimer of di-(pentoxy methyl) urea can be obtained. If the evaporation is continued, substantially all of the methoxy groups in the dissolved reaction product are replaced by pentoxy groups. After all methoxy groups and methanol have been eliminated, the solution may be evaporated to a concentration of 65 per cent solids and then diluted to about 45 per cent solids with petroleum naphtha, if desired.

*Example 2*

100 parts of dimethylol urea, 500 parts of n-butanol, and 1 part of a 10 per cent aqueous solution of sulfuric acid are kept at a temperature below 40° C. until the dimethylol urea has dissolved. The solution is filtered, and then strongly cooled until crystals of di-(butoxy methyl) urea have separated. The crystals are separated from the supernatant liquid by filtration, and 100 parts of the crystals are added to 200 parts of n-pentanol. The resulting solution is then evaporated under vacuum to a concentration of about 50 per cent solids.

*Example 3*

100 parts of dimethylol urea, 300 parts of methanol, and 1 part of a 10 per cent aqueous solution of sulfuric acid are kept at a temperature below 50° C. until the dimethylol urea has dissolved. The resulting solution is neutralized by addition of a saturated alcoholic solution of potassium hydroxide, filtered, and allowed to evaporate at 80° C. to one half of its original volume. The crystals of di-(methoxy methyl) urea which separate out from the solution upon cooling are removed from the supernatant liquid by filtration, and are then dried at a temperature of 55°–60° C., and 100 parts of the crystals are added to 200 parts of n-pentanol, together with 1 part of a 10 per cent solution of acetic acid in n-pentanol, and the resulting solution is then evaporated under vacuum to a concentration of about 50 per cent solids.

Various other embodiments of the invention may be devised to meet various requirements.

Having described our invention, we claim:

1. A process for making ethers consisting of derivatives of dimethylol urea containing a plurality of alkoxy groups in the molecule which comprises reacting a dialkyl ether of dimethylol urea in which each of the alkyl radicals has less than six carbon atoms with an alcohol containing a larger number of carbon atoms than contained in at least one of the alcohol radicals of the ether, and removing during the reaction the liberated alcohol.

2. A process for making derivatives of dimethylol urea containing alkoxy groups which comprises reacting dimethylol urea dimethyl ether with an alcohol containing a larger number of carbon atoms than contained in at least one of the alcohol radicals of the ether, and removing during the reaction the liberated alcohol.

3. A process for making derivatives of dimethylol urea containing alkoxy groups which comprises reacting a dialkyl ether of dimethylol urea in which each of the alkyl radicals has less than six carbon atoms with an alcohol containing a larger number of carbon atoms than contained in at least one of the alcohol radicals of the ether, removing during the reaction the liberated alcohol, and carrying out condensation of the resulting reaction product by heating.

4. A process for making derivatives of dimethylol urea containing alkoxy groups which comprises reacting dimethylol urea dimethyl ether with an alcohol containing a larger number of carbon atoms than contained in at least one of the alcohol radicals of the ether, removing during the reaction the liberated alcohol, and carrying out condensation of the resulting reaction product by heating.

JOHN A. MURRAY.
ANDREW W. KASSAY